United States Patent [19]
Butler

[11] Patent Number: 5,809,100
[45] Date of Patent: Sep. 15, 1998

[54] APPARATUS FOR DETECTING CHANGES IN PRELOAD ON A TIE ROD INSTALLED AS PART OF A CORE SHROUD REPAIR IN A BOILING WATER REACTOR

[75] Inventor: Patrick J. Butler, Alexandria, Va.

[73] Assignee: MPR Associates, Inc., Alexandria, Va.

[21] Appl. No.: 870,402

[22] Filed: Jun. 6, 1997

Related U.S. Application Data

[60] Continuation of Ser. No. 742,625, Nov. 1, 1996, abandoned, which is a division of Ser. No. 627,154, Apr. 3, 1996, Pat. No. 5,589,640.

[51] Int. Cl.⁶ .................................................. G21C 17/00
[52] U.S. Cl. .......................................... 376/258; 376/247
[58] Field of Search .................................. 376/245, 247, 376/248, 249, 258, 260, 302; 73/761, 785, 831, 846, 853, 856; 411/14; 81/57.38; 254/29 A

[56] References Cited

U.S. PATENT DOCUMENTS

| | | |
|---|---|---|
| 3,008,362 | 11/1961 | Tucker, Jr. . |
| 3,015,975 | 1/1962 | Biach . |
| 3,115,332 | 12/1963 | Singleton et al. . |
| 3,162,071 | 12/1964 | Biach . |
| 3,382,709 | 5/1968 | Sorensen . |
| 3,561,260 | 2/1971 | Reynolds . |
| 3,722,332 | 3/1973 | Jones . |
| 3,759,090 | 9/1973 | McFaul et al. . |
| 3,837,694 | 9/1974 | Frisch et al. . |
| 3,844,533 | 10/1974 | Markiewicz et al. . |
| 3,877,326 | 4/1975 | Köck et al. . |
| 3,943,819 | 3/1976 | Charron . |
| 3,969,810 | 7/1976 | Pagano . |
| 3,969,960 | 7/1976 | Pagano . |
| 3,995,828 | 12/1976 | Orban . |
| 4,027,559 | 6/1977 | Wallrafen . |
| 4,047,456 | 9/1977 | Scholz . |
| 4,062,227 | 12/1977 | Heyman . |
| 4,175,453 | 11/1979 | Exner et al. . |
| 4,185,504 | 1/1980 | Exner et al. . |
| 4,185,505 | 1/1980 | Exner et al. . |
| 4,185,506 | 1/1980 | Exner et al. . |
| 4,273,011 | 6/1981 | Exner et al. . |
| 4,295,393 | 10/1981 | Adcock . |
| 4,333,351 | 6/1982 | Bickford . |
| 4,454,790 | 6/1984 | Rieben . |
| 4,494,412 | 1/1985 | Hardy ........................................ 73/761 |
| 4,535,656 | 8/1985 | Orban . |
| 4,659,065 | 4/1987 | Simms ................................. 81/57.38 |
| 5,343,785 | 9/1994 | Holt et al. . |
| 5,392,322 | 2/1995 | Whitling et al. . |
| 5,402,570 | 4/1995 | Weems et al. ........................... 376/302 |
| 5,442,665 | 8/1995 | Dalke ..................................... 376/302 |
| 5,452,629 | 9/1995 | Heiermann et al. .................... 81/57.38 |
| 5,502,754 | 3/1996 | Erbes . |
| 5,600,689 | 2/1997 | Weems et al. ........................... 376/302 |
| 5,690,005 | 11/1997 | Jung et al. ............................... 81/57.3 |

FOREIGN PATENT DOCUMENTS

| | | |
|---|---|---|
| 2495320 | 6/1982 | France . |
| 2749536 | 5/1979 | Germany . |
| 2749537 | 5/1979 | Germany . |
| 2749538 | 5/1979 | Germany . |
| 2037430 | 7/1980 | United Kingdom . |

OTHER PUBLICATIONS

Lipford, B., et al, "Three Mile Island Revisited," Mechanical Engineering, pp. 42–47, Jan. 1991.

Primary Examiner—Daniel D. Wasil

[57] ABSTRACT

In a boiling water reactor having a core shroud disposed within a reactor vessel and a plurality of tie rods installed between vertically spaced sites on the core shroud as part of a core shroud repair, a method of measuring tie rod preload after installation includes the steps of lowering a tool into the reactor vessel from a remote location positioned externally of the reactor vessel, attaching the tool to an upper portion of a tie rod, using the tool to apply a tensile load along a longitudinal axis of the tie rod, measuring the tensile load applied to the tie rod, measuring axial displacement of the tie rod in response to the applied tensile load, plotting the applied load versus the axial displacement measured, and identifying a change in slope on the load-displacement plot occurring at a load corresponding to the tie rod preload.

11 Claims, 4 Drawing Sheets

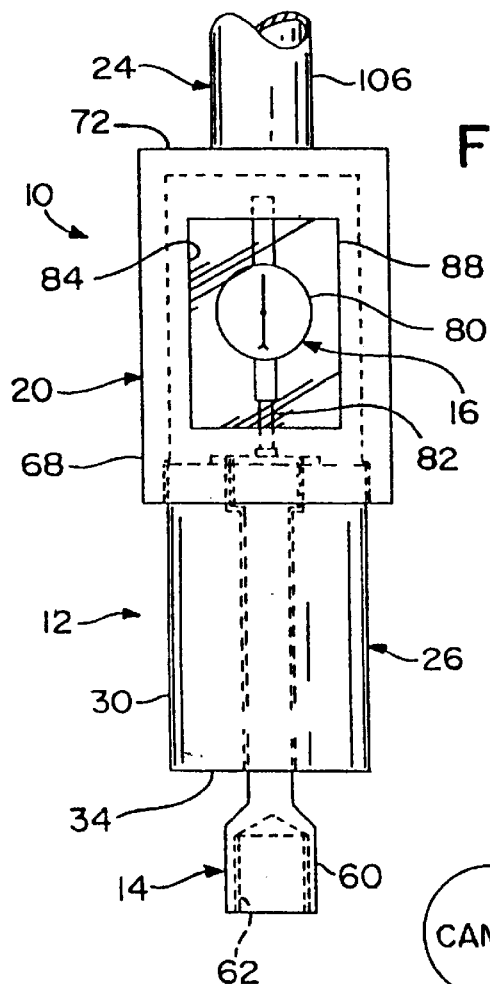
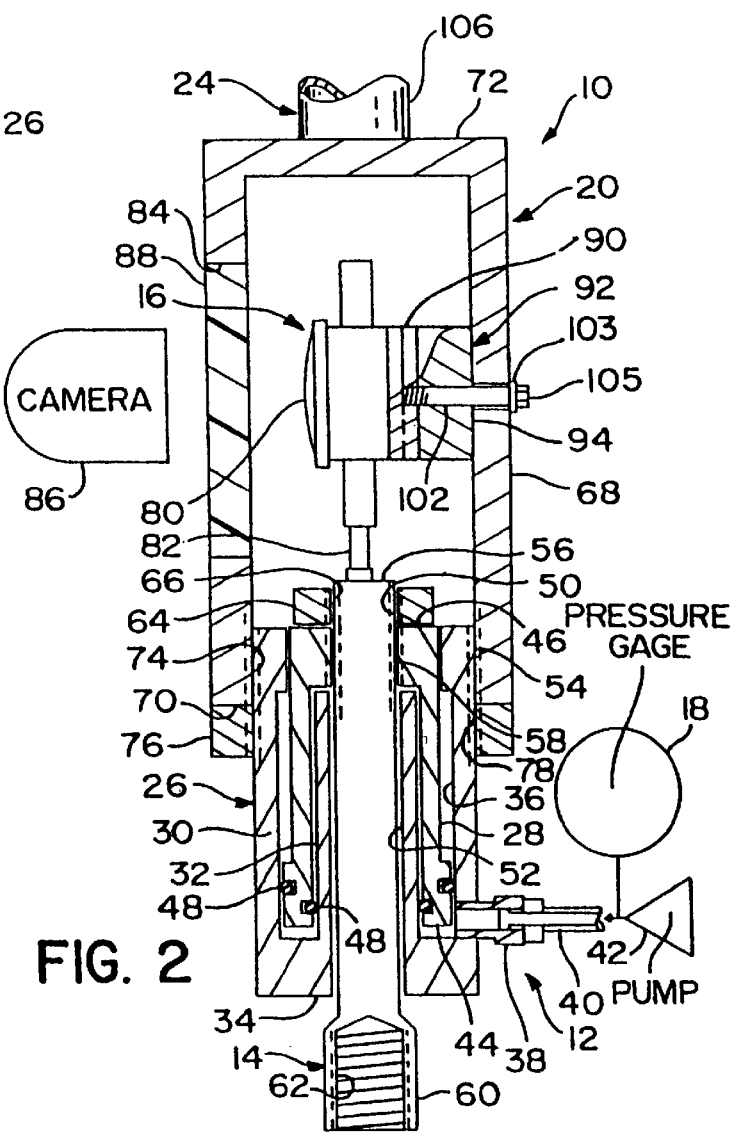
FIG. 1
FIG. 2

APPARATUS FOR DETECTING CHANGES IN PRELOAD ON A TIE ROD INSTALLED AS PART OF A CORE SHROUD REPAIR IN A BOILING WATER REACTOR

This application is a continuation of application Ser. No. 08/742,625, filed Nov. 1, 1996, now abandoned which is a division of patent application Ser. No. 08/627,154, filed Apr. 3, 1996, now U.S. Pat. No. 5,589,640.

BACKGROUND OF THE INVENTION

1. Field of the Invention

The present invention relates to boiling water nuclear reactors having a core shroud disposed concentrically within a reactor vessel and a plurality of tie rods installed in tension between vertically spaced sites on the core shroud at a respective plurality of angularly spaced locations about the periphery of the core shroud to axially compress the core shroud as part of a core shroud repair. In particular, the present invention relates to a method and apparatus for measuring the preload on such tie rods after installation in order to detect changes in the axially compressive preload applied to the core shroud by the tie rods.

2. Discussion of the Related Art

Boiling water reactor shrouds are disposed concentrically within reactor vessels to divide the flow of cooling water through the reactor vessels and to structurally support and align the fuel assemblies, steam separator assemblies and control rod guide tubes. The shrouds are generally cylindrical and are typically formed of multiple arcuate steel plates joined by welds along abutting vertical and horizontal edges. After periods of use, cracking of the shroud within heat affected zones of the welds tends to occur as a result of corrosion, radiation and stress. Cracking of the vertically oriented welds is expected to be minor and is considered acceptable because these welds are relatively short in length, relative to the overall shroud length, and because cracking along the vertically oriented welds does not adversely affect the function of the shroud. When excessive cracking of the horizontally oriented welds occurs, however, the shroud must either be replaced or repaired.

U.S. Pat. No. 5,402,570 to Weems et al, the disclosure of which is incorporated herein by reference, describes a method of repairing boiling water reactor core shrouds having horizontal cracks in heat affected zones of welds by securing plural tie rods in vertical orientation about the periphery of the cracked shroud to axially compress the shroud and thereby urge the opposing surfaces of the horizontal cracks toward one another. The method involves securing the tie rods between sites on the core shroud adjacent top and bottom portions of the shroud. Typically, the upper end of each tie rod is threaded and is made to pass through connection hardware, such as a bracket or beam, depending from the top of the shroud. A nut is then threaded onto the upper end of the tie rod and the tie rod tensioned to achieve a desired tie rod preload corresponding to an acceptable level of compression on the shroud. Tensioning of the tie rod is usually accomplished by threading a puller bar onto the upper end of the tie rod and using a hydraulic cylinder to lift the puller bar upwardly in a vertical direction. The nut is then tightened against the bracket so that, when the puller bar is released, an upwardly directed tensile force is exerted on the tie rod by the nut, and a corresponding downwardly directed compressive force is exerted by the nut on the bracket, thereby holding the shroud in axial compression along its length. This axial compression drives the opposing surfaces of any horizontal cracks toward one another, thereby urging the cracks together across all or part of the thickness of the shroud and preventing their adverse effects on the shroud structure. Axial compression of the shroud also improves the ability of the shroud to withstand axial or tensile loads caused by hydrostatic pressures and/or seismic events since such tensile loads are offset by the compressive preload and are thereby mitigated.

It is desirable for an axially compressive preload to be applied continuously to the shroud by the tie rods and for such a preload not to vary significantly from that originally applied by the tie rods at the time of installation; however, preloads can change after installation due, for example, to seismic events and/or thermal transients associated with the start-up and cool-down of the reactor. For example, changes in tie rod preload could occur due to cracking of the core shroud, settling and wear-in of threaded and other mechanical joints, thermal or neutron relaxation of the tie rods, or failure of the tie rods (for example, as a result of cyclic loading of the tie rods caused by thermal transients). To date, however, it has not been practical to detect changes in the axially compressive preload applied to the shroud by the tie rods due to the inaccessibility of the tie rods and the shroud and the highly radioactive and hostile environment within the reactor vessel.

SUMMARY OF THE INVENTION

Accordingly, it is a primary object of the present invention to determine whether the preload on a tie rod has changed following installation of the tie rod in a boiling water reactor as part of a core shroud repair.

Another object of the present invention is to determine whether the preload on a tie rod installed as part of a core shroud repair in a boiling water reactor has changed by remotely measuring the existing preload on the tie rod after the occurrence of a seismic event and/or after a period of operation of the reactor following installation of the tie rod.

It is a further object of the present invention to apply a tensile load to a tie rod installed as part of a core shroud repair in a boiling water reactor and to remotely measure the load applied to the tie rod as well as the axial displacement or deflection of the tie rod in response to the applied load in order to determiner the existing tie rod preload.

Yet another object of the present invention is to determine the existing preload on a tie rod installed as part of a core shroud repair in a boiling water reactor by identifying a change in the relationship between the tensile load applied to the tie rod and the resulting axial displacement of the tie rod which occurs when the applied load equals and exceeds the existing tie rod preload.

Some of the advantages of the present invention are that the method and apparatus can be used remotely to assure adequate axial compression of the shroud without having to detorque or unlock the nuts used to set the original tie rod preload, that the method and apparatus can be used upon initial installation of the tie rods and periodically thereafter as part of routine maintenance, and that the method and apparatus minimize reactor downtime and reduce the exposure of personnel to the potentially harmful effects of radiation.

The present invention is generally characterized in a method of measuring tie rod preload in a boiling water nuclear reactor having a core shroud disposed within a reactor vessel and a plurality of tie rods installed in tension between vertically spaced sites on the core shroud at a respective plurality of angularly spaced locations about the periphery of the core shroud as part of a core shroud repair. The method is performed after installation of the tie rods to determine changes in the preload on a tie rod and includes the steps of lowering a tool into the reactor vessel from a remote location positioned externally of the reactor vessel, attaching the tool to an upper portion of a tie rod, using the tool to apply a tensile load along a longitudinal axis of the tie rod, measuring the tensile load applied to the tie rod, measuring axial displacement of the tie rod as a result of the tensile load applied, plotting the load applied versus the axial displacement measured, and identifying a change in slope on the load-displacement plot occurring at a load corresponding to the tie rod preload.

A further aspect of the present invention is generally characterized in a method of measuring tie rod preload in a boiling water nuclear reactor having a core shroud disposed within a reactor vessel and a plurality of tie rods installed in tension between vertically spaced sites on the core shroud at a respective plurality of angularly spaced locations about the periphery of the core shroud as part of a core shroud repair. The method is performed after installation of the tie rods to determine changes in the preload on a tie rod and includes the steps of applying a tensile load along a longitudinal axis of the tie rod, measuring axial displacement of the tie rod in response to the applied tensile load, and remotely viewing the axial displacement measurement from a location externally of the reactor vessel.

Another aspect of the present invention is generally characterized in a tool for measuring tie road preload in a boiling water nuclear reactor having a core shroud disposed within a reactor vessel and a plurality of tie rods installed in tension between vertically spaced sites on the core shroud at a respective plurality of angularly spaced locations about the periphery of the core shroud as part of a core shroud repair, the tool including an elongate support member having an upper end for positioning externally of the reactor vessel and a lower end for positioning inside the reactor vessel adjacent the core shroud, a loading device suspended from the lower end of the support member and including a base for reacting against the core shroud and a puller movable relative to the base and having a configuration to couple with the upper end of a tie rod, a displacement indicator responsive to axial displacement of the puller relative to the base, and a load indicator responsive to axial loading of the tie rod by the puller.

Other objects and advantages of the present invention will become apparent from the following description of the preferred embodiments taken with the accompanying drawings, wherein like parts in each of the several figures are identified by the same reference numerals.

BRIEF DESCRIPTION OF THE DRAWINGS

FIG. 1 is a front view, in elevation, of a tool for measuring tie rod preload in a boiling water reactor according to the present invention.

FIG. 2 is a fragmentary side view, partly in section, of the tie rod preload measurement tool shown in FIG. 1.

DESCRIPTION OF THE PREFERRED EMBODIMENT

Figure 3:
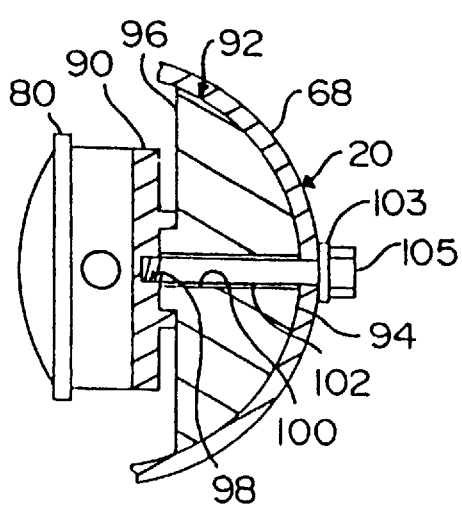
FIG. 3 is a fragmentary top view, partly in section, of the tie rod preload measurement tool of FIG. 1 showing a dial indicator mounted therein.

An apparatus or tool 10 for measuring preload on a tie rod in a boiling water nuclear reactor according to the present invention, is as illustrated in FIGS. 1–4, includes a loading device 12 for applying a lifting force to a puller 14, a displacement gauge or indicator 16 for measuring axial displacement of the puller, and a load indicator 18 for measuring the lifting force applied to the puller by the loading device. A housing or fixture 20 connects the loading device with an elongate support member 22, for example a pole, via an attachment or coupling 24.

Loading device 12 is shown in FIG. 2 as a conventional single-acting hydraulic cylinder 26 with a hollow piston or plunger 28. The cylinder shown has an outer cylindrical wall 30, an inner cylindrical wall 32 disposed concentrically within the outer cylindrical wall, and a bottom wall or base 34 of ring-like configuration extending transversely between lower ends of the inner and outer cylinder walls to define a hydraulic cavity 36 in the annular space between the walls. An inlet port 38 extends, through an opening in outer cylinder wall 30 to communicate with hydraulic cavity 36 and is configured to couple with a hydraulic line 40 leading from a pump 42 disposed remotely of the loading device. Piston 28 is slidably disposed within cavity 36 and is of generally cylindrical configuration with an outwardly protruding transverse flange 44 at a lower end and an inwardly protruding transverse flange 46 at an upper end. Seals 48 in the form of O-rings are disposed within annular recesses or grooves formed on opposite sides of the lower flange 44 and are compressed against the inner and outer cylinder walls above inlet port 38 to form a hydraulic seal about the periphery of the piston. Upper flange 46 extends inwardly over inner cylinder wall 32 to define an internally threaded central passage or opening 50 axially aligned with a central passage or opening 52 defined by the inner cylinder wall. Flange 46 also functions as a stop or abutment limiting downward movement of the piston looking at FIG. 2. An exterior surface of outer cylinder wall 30 is externally threaded at 54 to couple with housing 20 as will be explained further below.

Puller 14 is shown as an elongate rod or bar of generally cylindrical configuration having an upper end 56 which is externally threaded at 58 and a lower end 60 which is at least partly hollow to define an internally threaded recess 62. Recess 62 is configured to threadedly receive the upper end of a tie rod as will be explained further below. Puller 14 extends longitudinally through opening 52 in the cylinder and is coupled with piston 28 by threading upper end 56 of the puller into opening 50 defined by upper piston flange 46. Upper end 56 of the puller extends above the piston and is held in place by threading a lock nut 64 with an internally threaded opening 66 onto the upper end of the puller and tightening the lock nut against piston flange 46.

Housing 20 includes a hollow, cylindrical wall 68 which, when oriented in an upright vertical position as shown in FIGS. 1 and 2, extends from an open bottom 70 to a closed top 72. An inner surface of the cylindrical housing wall adjacent bottom 70 is internally threaded at 74 to receive and threadedly couple with the upper end of hydraulic cylinder 26. A lock ring 76 with an internally threaded opening 78 is threaded onto the hydraulic cylinder beneath housing 20 and is tightened against the bottom of the housing to maintain a secure connection therebetween. Displacement indicator 16, which is shown as a conventional dial indicator having a dial housing 80 and a plunger 82, is mounted within housing 20, and a viewing port or portal 84 of generally rectangular configuration is formed through the cylindrical wall of the housing opposite the dial housing of the indicator to permit remote viewing of the face of the dial housing using a standard underwater camera 86 as illustrated in FIG. 2. A window 88, formed of an optically transparent, translucent or tinted plastic or glass material, is optionally disposed in the portal to prevent coolant water from entering into the housing from the reactor vessel while at the same time permitting the displacement indicator disposed within the housing to be viewed remotely. Use of a window to close the portal is also advantageous in that the environment within the housing can be controlled so that, for example, a displacement indicator disposed within the housing can operate under environmental conditions for which it has been calibrated rather than having to be adjusted to compensate for changes due to environmental conditions existing in the reactor vessel, such as hydrostatic pressure.

As best seen in FIGS. 2 and 3, dial indicator 16 is mounted within housing 20 opposite portal 84 using a standard adjustable bracket 90 attached to dial housing 80 and a spacer 92 having an outer surface 94 with a radius of curvature to fit conformably within cylindrical wall 68 of the housing and an inner surface 96 with a configuration to couple with bracket 90. Bracket 90 includes a threaded hole 98 and the spacer is formed with a through-hole 100 axially aligned with the threaded hole so that a bolt or screw 102 can be passed through an opening in the cylindrical wall of the housing and hole 100 in the spacer to be threadedly received within hole 98 in the bracket, thereby securing the dial indicator to the cylindrical wall in fixed relation to the housing. A washer 103 is shown disposed between the head 105 of bolt 102 and the outer surface of housing 20. The size and shape of the spacer are chosen to locate the dial housing opposite the portal so that the front or face of the dial housing can be viewed remotely through the portal. The location of the dial housing is also chosen so that plunger 82 of the dial indicator 16 is normally axially aligned with and in contact with the upper end of puller 14.

Figure 4:
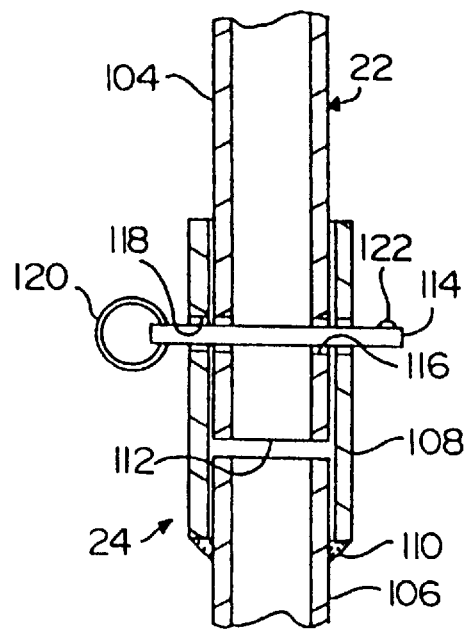
FIG. 4 is a fragmentary side view, partly in section, of a pole attachment for use with the tie rod preload measurement tool according to the present invention.
Figure 5:
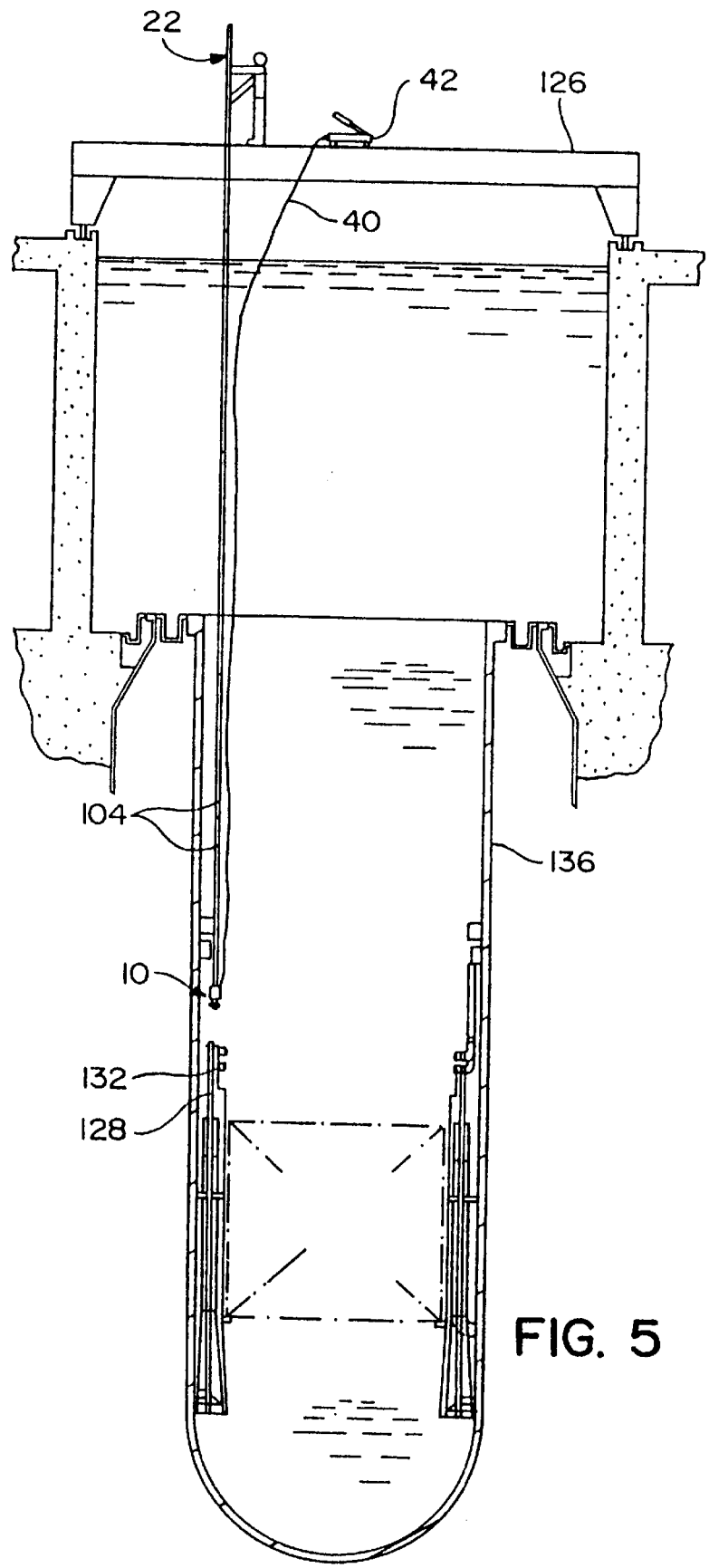
FIG. 5 is schematic illustration of a boiling water reactor illustrating use of the tie rod preload measurement tool according to the present invention.

Tool 10 is preferably suspended from an elongate support member, for example a pole 22, using suitable attachment hardware, such as the pole attachment 24 shown in FIG. 4. Pole 22 can be of conventional or custom design so long as the length of the pole is sufficient to lower the tool into the reactor vessel from a remote location above the vessel, for example from a refuel bridge suspended about sixty feet above the top of the shroud. Referring to FIG. 5, the pole is preferably composed of individual segments or sections 104 of predetermined length (e.g., six, eight or ten foot lengths), any number of which can be connected together to achieve a desired pole length. The lowermost of the sections 104 is attached to the housing 20 via pole attachment 24, which includes a first tubular member 106 extending vertically upward from the top of housing 20 and having an outer diameter similar to that of the pole, and a second tubular member 108 fitted telescopically over the first tubular member and secured thereto by circumferential welds at 110. A lower end 112 of the pole is telescopically received within the second tubular member 108 and is secured with a pin 114 extending through aligned openings 116 and 118 formed through the pole and the second tubular member, respectively. A loop 120 and detent 122 at opposite axial ends of the pin prevent the pin from being inadvertently dislodged while at the same time allowing the user to remove the pin by pulling on the loop with enough force to overcome the bias forcing the detent outwardly of the pin longitudinal axis.

A method of measuring tie rod preload in a boiling water reactor according to the present invention is illustrated in FIGS. 5–9 using the tool embodiment described above. Tool 10 is attached to a first pole section 104 by inserting a lower end 112 of the pole section into the pole attachment 24 at the top of housing 20 and inserting the pin 114 through axially aligned holes 116 and 118 in the pole attachment and the pole section, respectively, as shown in FIG. 4. The pole section 104 is then 14 lowered from a refuel bridge 126 with tool 10 attached, as shown in FIG. 5, and additional sections 104 are added until the length of the pole is such that the tool is disposed at a vertical elevation adjacent an upper end of the tie rod 128 to be tested.

Figure 6:
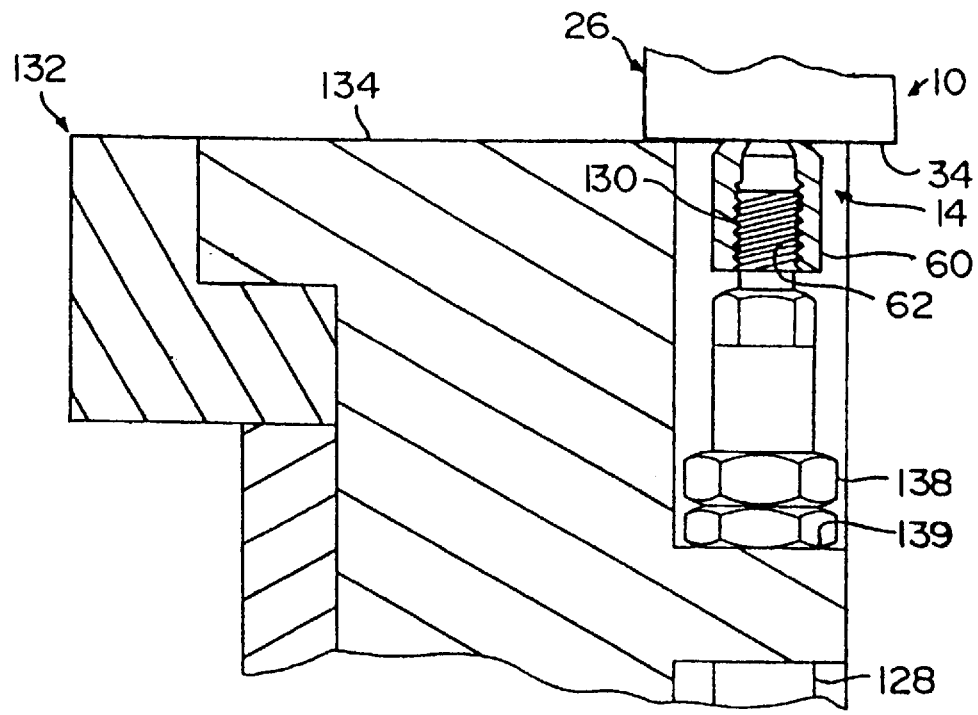
FIG. 6 is an enlarged fragmentary view, partly in section, illustrating attachment of the tie rod preload measurement tool to a tie rod according to the present invention.

Hydraulic line 40 is connected with inlet port 38 of the hydraulic cylinder before the tool is lowered into the reactor vessel and, as additional sections are added, the hydraulic line is attached to the pole 22, for example using a clamping mechanism or tape. The pole is remotely controlled from the refuel bridge to bring the lower end of puller 14 into axial alignment with the upper end 130 of tie rod 128. The pole is then lowered to cause the upper end of the tie rod to be received within the threaded opening 62 at the lower end of the puller, and the pole is rotated to cause the puller to be threaded onto the tie rod as shown in FIG. 6. Rotation of the pole is discontinued when base 34 of the hydraulic cylinder is made to react against or abut the shroud 132, for example via a bracket 134 connected to the shroud, or when the puller is fully threaded onto the tie rod.

At this point, hydraulic cylinder 26 is preferably in an unpressurized condition or state, with piston 28 disposed in a rest position where upper piston flange 46 abuts inner cylinder wall 32 and lower piston flange 44 is disposed adjacent inlet port 38 as shown in FIG. 2. With piston 28 in the rest position as shown, plunger 82 of dial indicator 16 will be in a fully distended state or condition contacting upper end of puller 14 and causing the dial indicator to indicate a value of zero axial displacement. It will be appreciated, however, that values other than zero could be indicated in the rest position since net axial displacement can be calculated by subtracting the initial non-zero value from subsequently measured values of displacement.

In order to measure tie rod preload, a slowly increasing axial load is applied to the upper end of the tie rod while periodically measuring the applied load and the axial deflection of the tie rod caused by the applied load. Pump 42 is used to pressurize the hydraulic cylinder 26, thereby exerting an upwardly directed lifting force on piston 28 and, thus, puller 14 and tie rod 128 attached to the puller. The load applied by the hydraulic cylinder is determined by measuring the hydraulic fluid pressure at the pump, for example using a pressure gauge 18, and the applied load lodge will typically be proportional to the hydraulic fluid pressure.

As the hydraulic pressure is increased incrementally, the deflection of tie rod 128 is determined by measuring the axial displacement of puller 14. Puller 14 is lifted or forced upwardly in a vertical direction with piston 28 as the pressure is increased, thereby depressing plunger 82 of the dial indicator into dial housing 80 and causing the dial indicator to indicate the amount of axial deflection of the tie rod in response to the applied load. The amount of deflection can be determined remotely by viewing the read-out on the face of the dial indicator 16 through window 88 in the housing 20, for example using a system including commercially available underwater cameras, such as those available from Rees and Westinghouse. These underwater cameras, which are currently used to support in-vessel work and inspections, are typically lowered into the reactor vessel using poles similar to the elongate support member described above.

Figure 9:
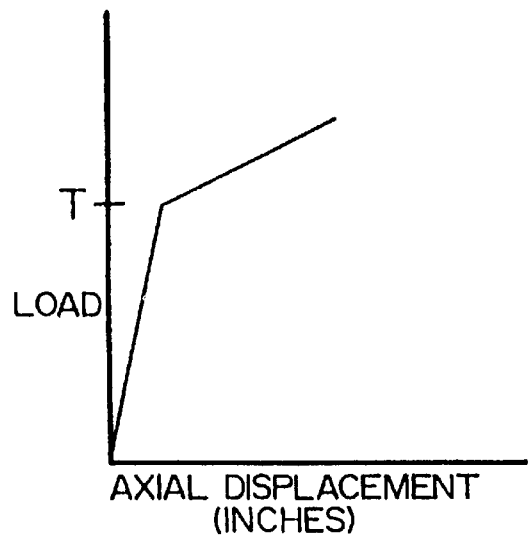
FIG. 9 is a graph of applied load versus axial displacement as might typically be generated when measuring tie rod preload according to the present invention.

Applied load is then plotted against axial displacement, for example as shown in FIG. 9, in order to identify a change in the slope, that is, a change in the relationship between the applied load and the axial displacement, which occurs when the applied load equals and exceeds the existing tie rod preload. The applied load at which this change occurs is equal to the tie rod preload. When the existing tie rod preload has been determined, the hydraulic cylinder is depressurized to allow the piston to move vertically downward from the lifted position to the rest position, thereby releasing the applied load, and the tool is unthreaded from the tie rod and withdrawn from the reactor vessel or moved to another tie rod in order to measure the existing preload thereof. If an existing tie rod preload is found to be inadequate, the tie rod can be retensioned in the same way as during installation.

Figure 7:
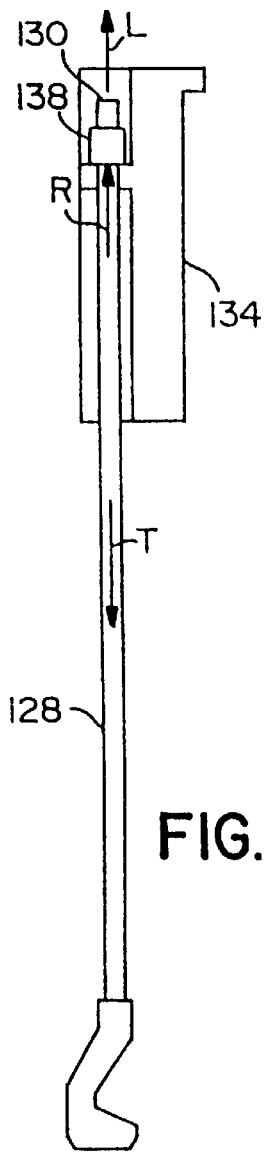
FIG. 7 is a free body diagram of a tie rod and mounting bracket illustrating the forces involved when measuring tie rod preload according to the present invention.
Figure 8:
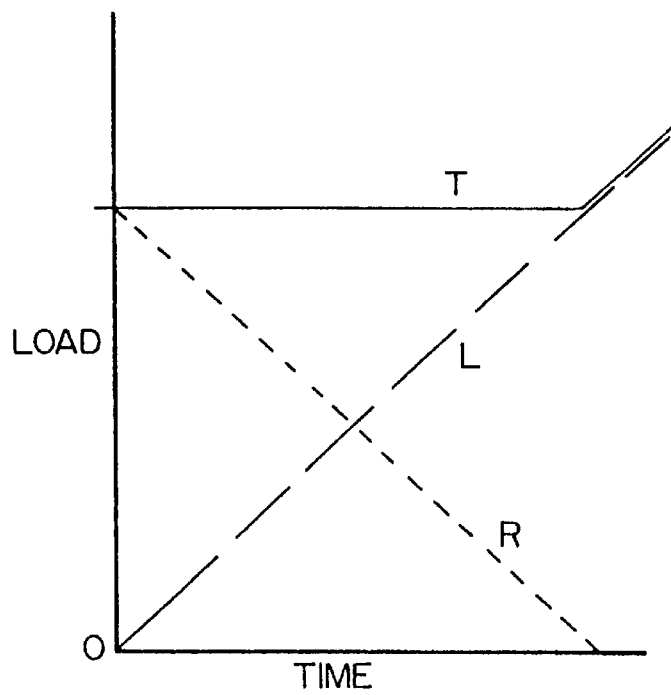
FIG. 8 is a graph of load versus time for the forces illustrated in FIG. 7.

In order to better understand how the load and axial displacement measurements can be used to determine tie rod preload, reference is made to FIG. 7, in which a free body diagram of a tie rod 128 and a bracket 134 is shown. In a typical tie rod installation, force equilibrium requires that the reactions on the connection hardware be equal to the tensile preload in the tie rod, and therefore the bearing load R of the nut 138 on bracket 134 is also equal to the tensile preload T in the tie rod. The method according to the present invention takes advantage of the fact that a load L applied to an upper portion 130 of the tie rod above nut 138 will, if equal to or less than the existing preload T, act only to reduce the bearing load R of the nut against the bracket and will not result in significant axial deflection of the tie rod. However, a load L equal to the tie rod preload T will reduce the bearing load R of the nut against the bracket to zero, and loads L greater than the tie rod preload T will result in axial deflection of the tie rod. This is shown graphically in FIG. 8 in terms of load versus time. Initially, the tie rod preload T and bearing load R are equal and the applied load L is zero. As the applied load L increases, however, the bearing load R is reduced an amount equal to the load applied so that, in the direction of increasing time, the line representing the applied load L extends diagonally upward while the line representing the bearing load R extends diagonally downward. When the applied load L equals the existing tie rod preload T, the bearing load R is reduced to zero, as indicated in FIG. 8 by the bearing load line intersecting the time axis. Applied loads L greater than the existing tie rod preload T cause the tie rod to lift away from the bracket, as indicated by the diagonal deviation from horizontal of the line representing the load on the tie rod.

Accordingly, when the applied load measured is plotted against the axial displacement or deflection measured, as shown in FIG. 9, a change in the load versus deflection relationship will be evident when the applied load equals and exceeds the existing tie rod preload T. The applied load at which this change occurs will be equal to the tie rod preload T. More specifically, when the applied load exceeds the existing tie rod preload T, the slope of the load-displacement curve will change, providing a clear indication of when the tie rod preload has been exceeded. Typical tie rod preloads will vary between about 0 and about 100,000 pounds depending upon the design of the particular tie rod and boiling water reactor core shroud.

Importantly, the magnitude of the change in the slope of the load versus deflection curve must be large enough to provide a clear indication of when the load applied by the tool equals the preload on the tie rod. The magnitude of the change in slope is affected by the relative stiffness of the preload measurement tool, the tie rod and the shroud. The magnitude of the change in slope can be made large by structural design of the tool (as well as that portion of the bracket 134 between the loading mechanism and the nut seating surface 139) such that the stiffness of the loaded parts of the tool and the bracket is large relative to the stiffness of the tie rod. In addition, for the magnitude of the change in slope to be large, the individual tie rod to be tested must have a lower stiffness than the shroud. Design requirements for tie rod repairs and the fact that multiple tie rods are used, generally results in individual tie rods which are much less stiff than the shroud being repaired. The combined stiffness of the preload measurement tool, the bracket and the shroud can have any value greater than that of an individual tie rod but is preferably greater than about twice the stiffness of an individual tie rod.

From the above, it will be appreciated that the present invention permits remote measurement of tie rod preload in any type of boiling water reactor having a core shroud disposed within a reactor vessel and a plurality of tie rods installed in tension between vertically spaced sites on the core shroud at a respective plurality of angularly spaced locations about the periphery of the core shroud as part of a core shroud repair. By "installed" is meant being secured in tension between sites on the shroud, and by "core shroud repair" is meant preventative as well as restorative installation of tie rods between vertically spaced sites on a cracked or uncracked shroud at a respective plurality of angularly-spaced locations about the periphery of the shroud to axially compress the shroud. It will also be appreciated that the method and tool according to the present invention can be used to measure tie rod preload immediately after initial installation of the tie rods as part of a core shroud repair or periodically thereafter as part of routine maintenance or inspection.

While a specific tool has been shown and described herein to illustrate a method of measuring tie rod preload according to the present invention, it will be appreciated that various other types of tools employing different loading and measuring devices can be used in accordance with the present invention. For example, most nuclear power plants are provided with bridge cranes, and it is conceivable that such a crane could be used to apply a tensile load to a tie rod.

The tool components described herein can be made of any suitable materials but are preferably formed of corrosion resistant, high strength materials such as, for example, Type 304 XM-19 stainless steel, Type 17-4H stainless steel and Type X-750 nickel alloy, so as to prevent corrosion products such as iron oxide from contaminating the coolant water within the reactor vessel.

The tool is preferably lowered into the reactor vessel from a remote location above the vessel, for example from the refuel bridge of the reactor building, using an elongate support member such as a conventional multi-sectioned pole; however, other support members can be used including, but not limited to, cables, elongate handles, solid rods, and shafts formed of multiple telescoping members. Any method can be used to connect the tool to the support member such as, for example, the use of threaded couplings and spring-loaded detents.

Any type of loading device can be used to apply a tensile load to the tie rod including, but not limited to, single and double acting hydraulic cylinders with and without center holes, cranes, as well as pneumatic, thermal and electromechanical devices. Some examples of suitable single acting hydraulic cylinders with center holes include the Enerpac RCH-202 hydraulic cylinder with 20 ton cylinder capacity and the Power Team RH203 hydraulic cylinder.

When hydraulic cylinders are used as the loading device, any type of pump can be used to pressurize the cylinders including, but not limited to, hydraulic hand pumps such as the Power Team P12, P55, P59, P157, P159 and P460 and the Enerpac P142, P392, P202, P141 and P391 single and double speed hand pumps.

The puller can have any configuration to couple the tie rod with the loading device including, but not limited to, the elongate bar configuration shown as well as solid and hollow configurations of various cross-sectional shape and size. The puller is preferably provided with a threaded recess to couple with the upper end of a tie rod; however, any type of coupling can be used dependent upon the design of the particular tie rod being tested.

Axial displacement or deflection of the tie rod can be measured using any type of displacement indicator including, but not limited to, dial indicators, strain gages, linear displacement potentiometers, rulers and ultrasonic measurement devices. Preferably, the displacement indicator will have an accuracy of between about 0.001 and about 0.003 inches. Some suitable dial indicators include the Brown & Sharpe Tool Nos. 599-8141-611-1, 599-241-611-1, 599-341-611-1, and 599-8231-941-1 and Starrett Series 25, 655 and 656 dial indicators. Suitable mounting brackets for the above listed dial indicators include the Brown & Sharpe Tool Nos. 599-8200-2131 and 599-8200-2131-1 and Starrett Series 6608M, 6878M and 6903 adjustable back dial mounts. Depending upon the type of displacement indicator employed, a read-out or reading can be obtained remotely by viewing the indicator in the reactor vessel or by communicating the information to a remote location externally of the reactor vessel for observation.

When the displacement indicator is disposed within a housing, the housing is preferably provided with a portal opposite the indicator to allow remote viewing of the indicator with an underwater camera, periscope or by direct visual observation in the case of a diver being sent down into the reactor vessel. The portal can be open or closed depending upon the desirability of exposing the interior of the housing to conditions of the coolant water, such as hydrostatic pressure. In general, however, it is desirable for the housing to be sealed so that the loading and measuring devices coupled with or disposed within the housing can operate at or near their calibrated conditions. It will be appreciated that various gaskets and seals can be used to seal the housing, and that the interior or exterior of the housing can be illuminated to facilitate remote observation.

While load and axial displacement data have been shown and described herein as being graphically plotted, it will be appreciated that such data can be manipulated computationally without the use of graphs in order to identify the change in the relationship between the applied load and the axial displacement which occurs when the applied load equals and exceeds the existing tie rod preload.

Inasmuch as the present invention is subject to many variations, modification and changes in detail, it is intended that all subject matter discussed above or shown in the accompanying drawings be interpreted as illustrative only and not be taken in a limiting sense.

What is claimed is:

1. In a boiling water reactor having a core shroud with a stiffness disposed within a reactor vessel and a plurality of tie rods with respective stiffnesses installed as part of a core shroud repair between vertically spaced sites on the core shroud at a respective plurality of angularly spaced locations about the shroud periphery, a tool for measuring preload on a tie rod after installation, said tool comprising an elongate support member having an upper end for positioning externally of the reactor vessel and a lower end for positioning inside the vessel adjacent the core shroud;

a loading device suspended from said lower end of said support member and including a base for reacting against the core shroud and a puller movable relative to said base and having a configuration to couple with the upper end of a tie rod to apply a load to the tie rod;

a displacement indicator responsive to axial displacement of said puller relative to said base for indicating displacement of the tie rod; and a load indicator responsive to axial loading of said puller for indicating the load applied to the tie rod;

wherein said loading device has a stiffness which in combination with the stiffness of the core shroud is greater than about twice the stiffness of the tie rod so that, when the displacement of the tie rod is plotted versus the load applied to produce a curve with a slope, a substantial change in the slope of the curve will occur at a load corresponding to the preload on the tie rod to provide a clear indication of the tie rod preload.

2. A tool for measuring preload on a tie rod in a boiling water reactor as recited in claim 1 wherein said loading device includes a hydraulic cylinder with a movable piston and said puller is coupled with said piston.

3. A tool for measuring preload on a tie rod in a boiling water reactor as recited in claim 2 wherein said hydraulic cylinder is hollow and said puller extends through said hollow hydraulic cylinder to connect with said piston.

4. A tool for measuring preload on a tie rod in a boiling water reactor as recited in claim 3 wherein said lower end of said puller includes an internally threaded recess for receiving an externally threaded upper end of a tie rod.

5. A tool for measuring preload on a tie rod in a boiling water reactor as recited in claim 4 wherein said lower end of said puller protrudes from said base of said hydraulic cylinder an axial distance of predetermined dimension to cause a peripheral edge of said cylinder to react against the core shroud when said puller is threadedly coupled with a tie rod.

6. A tool for measuring preload on a tie rod in a boiling water reactor as recited in claim 1 and further comprising a housing mounting said loading device and said displacement indicator at said lower end of said support member.

7. A tool for measuring preload on a tie rod in a boiling water reactor as recited in claim 6 wherein said displacement indicator includes a dial indicator with a plunger disposed within said housing.

8. A tool for measuring preload on a tie rod in a boiling water reactor as recited in claim 7 wherein said housing includes a portal aligned with a face of said dial indicator to permit remote observation of said dial indicator with an underwater camera.

9. A tool for measuring preload on a tie rod in a boiling water reactor as recited in claim 7 wherein said plunger rests upon said puller.

10. A tool for measuring preload on a tie rod in a boiling water reactor as recited in claim 2 and further comprising a pump for positioning externally of the reactor vessel, said pump being selectively operable to pressurize said hydraulic cylinder in order to induce movement of said puller.

11. A system for measuring preload on a tie rod in a boiling water reactor comprising a tool as recited in claim 8 and further comprising an underwater camera positionable within the reactor vessel to view said dial indicator through said portal.

* * * * *